US011859440B2

(12) United States Patent
Kozisek et al.

(10) Patent No.: US 11,859,440 B2
(45) **Date of Patent: *Jan. 2, 2024**

(54) INSULATED ARCHITECTURAL COVERING SYSTEMS AND METHODS

(71) Applicant: Overhead Door Corporation, Lewisville, TX (US)

(72) Inventors: Neil A Kozisek, Grand Island, NE (US); Scott A. Juengst, Grand Island, NE (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,307

(22) Filed: Mar. 10, 2022

(65) Prior Publication Data

US 2022/0195787 A1 Jun. 23, 2022

Related U.S. Application Data

(63) Continuation-in-part of application No. 16/786,766, filed on Feb. 10, 2020, now Pat. No. 11,286,708.

(51) Int. Cl.
*E06B 3/70* (2006.01)

(52) U.S. Cl.
CPC .... *E06B 3/7015* (2013.01); *E06B 2003/7044* (2013.01)

(58) Field of Classification Search
CPC ...... E06B 3/263; E06B 3/2632; E06B 3/2634; E06B 3/481; E06B 3/483; E06B 3/725;
(Continued)

(56) References Cited

U.S. PATENT DOCUMENTS 4,723,388 A * 2/1988 Zieg ........................ E06B 3/685 52/456
5,965,231 A * 10/1999 Rotermund .............. C08J 9/127 252/372

(Continued)

FOREIGN PATENT DOCUMENTS

DE 19537459 C1 4/1997
EP 0158799 A2 10/1985

(Continued)

OTHER PUBLICATIONS

Huber et al., Thermal Conductivity of Gases; https://tsapps.nist.gov/publication/get_pdf.cfm?pub_id=907540. Accessed Jun. 3, 2023.*

(Continued)

*Primary Examiner* — Christine T Cajilig
(74) *Attorney, Agent, or Firm* — HAYNES AND BOONE, LLP

(57) ABSTRACT

An apparatus for an architectural opening comprises a plurality of panels pivotably connected together. At least one of the plurality of panels comprises a frame comprising a plurality of first frame members connected to a plurality of second frame members at respective interfaces to define at least one opening. The interfaces are defined by ends of the plurality of first frame members positioned at least partially within respective apertures defined in the plurality of second frame members. Each of the first and second frame members comprise an internal cavity filled with a gas having a thermal conductivity between 2 mW/(m·K) and 25.5 mW/(m·K) at 25 degrees Celsius. The at least one of the plurality of panels also comprises an inset panel secured within the at least one opening.

17 Claims, 8 Drawing Sheets

(58) Field of Classification Search
CPC ..................... E06B 3/726; E06B 3/728; E06B 2003/26325; E06B 2003/7044; E06B 2003/7076; E06B 2003/708
See application file for complete search history.

(56) References Cited

U.S. PATENT DOCUMENTS

| | | | | |
|---|---|---|---|---|
| 6,056,037 | A * | 5/2000 | Jonkman, Sr. | E05D 15/262 49/362 |
| 6,209,269 | B1 * | 4/2001 | Valderrama | E06B 3/24 52/656.5 |
| 8,534,027 | B1 * | 9/2013 | Cullinane | E06B 3/726 52/784.15 |
| 9,777,530 | B1 | 10/2017 | Haba | |
| 2008/0236052 | A1 * | 10/2008 | Fleming | E04B 1/803 52/2.22 |
| 2009/0223131 | A1 * | 9/2009 | Wiese | E06B 3/7001 49/506 |
| 2010/0000178 | A1 * | 1/2010 | Eggert | B29C 70/84 52/745.19 |
| 2013/0052932 | A1 * | 2/2013 | Schwaiger | E06B 3/26345 454/196 |

FOREIGN PATENT DOCUMENTS

| | | | |
|---|---|---|---|
| EP | 0556600 | A1 | 8/1993 |
| WO | 2017158525 | A1 | 9/2017 |

OTHER PUBLICATIONS

"Glass Garage Door & Entry Systems, Inc." https://glassgaragedoors.com/media/35537/water-package-info.pdf., visited Feb. 10, 2020 (2 pages).
"Become an 80/20 Builder," https://8020.net/product-basics, visited Feb. 10, 2020 (11 pages).

* cited by examiner

INSULATED ARCHITECTURAL COVERING SYSTEMS AND METHODS

CROSS-REFERENCE TO RELATED APPLICATIONS

The present application is a continuation-in-part of U.S. application Ser. No. 16/786,766, filed Feb. 10, 2020, entitled “VACUUM INSULATED ARCHITECTURAL COVERING SYSTEMS AND METHODS,” the disclosure of which is hereby incorporated by reference for all purposes.

TECHNICAL FIELD

One or more embodiments of the present disclosure relate generally to architectural covering and more particularly, for example, to systems and methods for an insulated architectural covering.

BACKGROUND

Insulated architectural coverings, such as garage doors, retractable storefronts, and the like, typically have a metal framework filled with foam insulation to reduce heat loss through the frame. Foam insulated architectural coverings are often heavy and require heavy springs and other hardware to install and move the covering. Current techniques can also limit when the frame can be finished in the production process, often requiring the frame members to be foam insulated and assembled post-finishing, resulting in scratches, dents, and scuffs to the finishing and the finished product. In addition, current production techniques are often difficult to automate. For example, foam insulated doors typically include a bolted frame design, requiring expensive and time-consuming assembly.

Therefore, there is a need in the art for systems and methods for an insulated architectural covering that addresses the deficiencies noted above, other deficiencies known in the industry, or at least offers an alternative to current techniques.

SUMMARY

Techniques are disclosed for systems and methods associated with an insulated architectural covering. In accordance with one or more embodiments, an apparatus for an architectural opening includes a plurality of panels pivotably connected together. At least one of the plurality of panels includes a frame including a plurality of first frame members connected to a plurality of second frame members at respective interfaces to define at least one opening. Each frame member may include an internal cavity filled with a gas having a thermal conductivity less than atmospheric air. An inset panel may be secured within the at least one opening.

In accordance with one or more embodiments, a panel configured to at least partially cover an architectural opening includes a frame including at least one opening defined by a plurality of first frame members connected to a plurality of second frame members at respective interfaces. Each frame member may include an internal cavity filled with a gas having a thermal conductivity less than atmospheric air. An inset panel may be secured within the at least one opening.

In accordance with one or more embodiments, a method may include connecting a plurality of first frame members to a plurality of second frame members at respective interfaces to define at least one opening of a panel frame. Each frame member may include an internal cavity. The method may include filling the internal cavities of each frame member with a gas having a thermal conductivity less than atmospheric air. The method may include inserting in inset panel within the at least one opening.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, multi-panel architectural coverings, such as garage doors, retractable storefronts, windows, entry doors, or the like, benefit from a vacuum insulated frame design. The frame may define at least one opening within which a transparent or translucent window or other inset panel is secured. Each opening may be defined by a pair of rails secured to a pair of stiles at respective interfaces. The interfaces may be sealed in a manner allowing a vacuum to be created inside at least a portion of the frame. The architectural covering may include a plurality of panels, each panel including the frame design described herein. The multiple panels of the architectural covering may be secured together via one or more hinges to allow articulation of the covering as the covering is moved between positions, such as to enable movement of the covering along a track between a vertical (closed) position and a horizontal (open or overhead) position.

Figure 1:
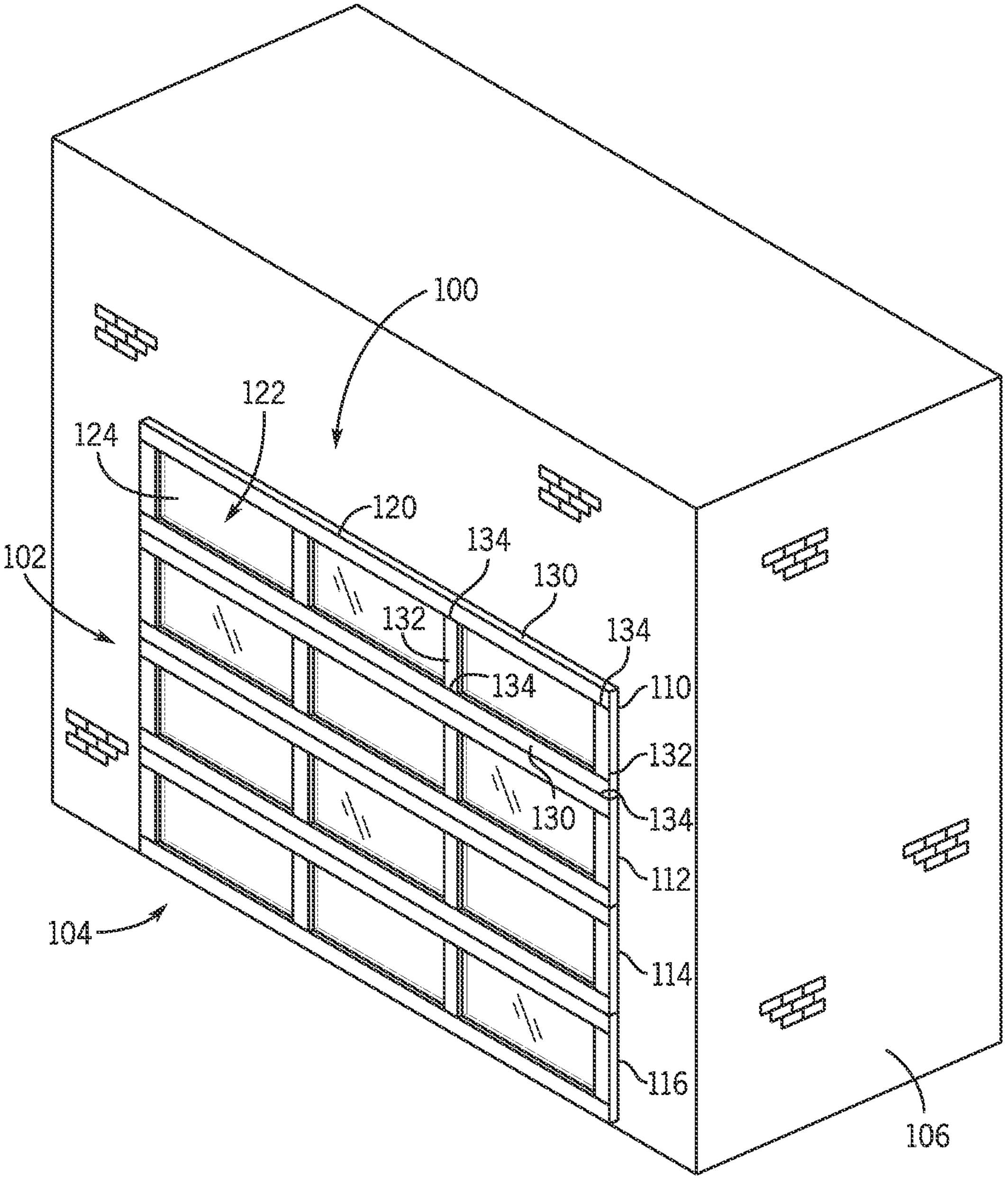
FIG. 1 illustrates a front perspective view of a multi-panel covering for an architectural opening in accordance with an embodiment of the disclosure.
Figure 2:
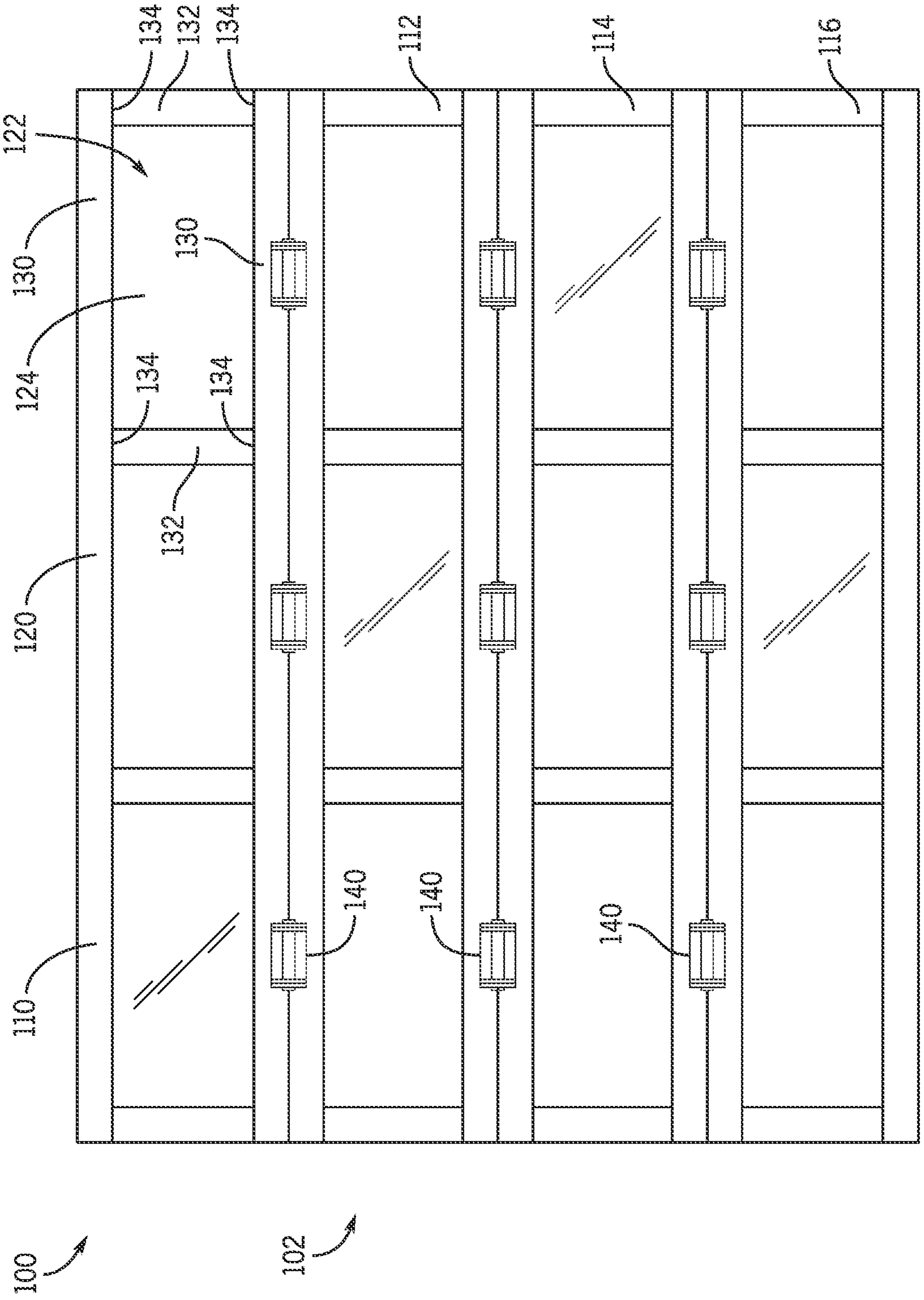
FIG. 2 illustrates a rear view of the multi-panel covering of FIG. 1 in accordance with an embodiment of the disclosure.

FIG. 1 illustrates a front perspective view of a multi-panel covering 100 for an architectural opening in accordance with an embodiment of the disclosure. FIG. 2 illustrates a rear view of the multi-panel covering 100 of FIG. 1 in accordance with an embodiment of the disclosure. The covering 100 may be any type of apparatus configured to cover or otherwise fill an architectural opening 104. For example, the architectural opening 104 may be a framed opening of a structure or building 106, such as a garage door opening, a doorway, a window frame, a storefront opening, or the like. The covering 100 may be configured to at least partially cover or fill the architectural opening 104. For example, the covering 100 may be a garage door configured to fill or fit within a garage door opening, a door configured to fill or fit within a doorway, a window configured to fill or fit within a window frame, or a door or panel configured to fill or fit within a storefront opening. For ease of reference, however, FIGS. 1-2 illustrate the covering 100 as a garage door, though other configurations are contemplated.

Depending on the application, the covering 100 may be a sectional or multi-panel door. For instance, the covering 100 may include a plurality of panels 102 that together at least partially enclose an opening 104 in a building or other structure 106. In the embodiments illustrated in FIGS. 1-2, for example, the covering 100 includes a first panel 110, a second panel 112, a third panel 114, and a fourth panel 116 that close, cover, or fit within a garage opening defined by two jambs, a header, and a driveway or garage floor, though other configurations are contemplated. For instance, the covering 100 may include any number of panels 102 and may be located in any suitable opening 104 of a building or other structure 106. The plurality of panels 102 may be configured identical to one another or may be different from one another. For instance, the first panel 110, second panel 112, third panel 114, and fourth panel 116, or any combination thereof, may be identical to one another. In some embodiments, the first panel 110, second panel 112, third panel 114, and fourth panel 116, or any combination thereof, may be configured different from one another, such as include differing heights, configurations, or the like.

With continued reference to FIGS. 1-2, each panel 102 may include many configurations. For example, at least one of the plurality of panels 102 may include a frame 120 defining at least one opening 122, and an inset panel 124 secured within the at least one opening 122. For example, the frame 120 may define a plurality of openings 122, and a respective inset panel 124 may be secured within each opening 122 of the frame 120. The inset panel 124 may include many configurations. For instance, the inset panel 124 may be an insulated member to provide an insulation characteristic. In some embodiments, the inset panel 124 may be a transparent, non-transparent, or translucent window, although other configurations are contemplated. The window may include multiple panes of glass, with the spaces between the panes turned into a vacuum or filled with gas with a lower thermal conductivity and heat capacity than "air." The inset panel 124 may be a pane of glass, polymer, metal, natural material such as wood, or other material. In some embodiments, the inset panel 124 may be sealed along its sides to interface with the frame 120. In embodiments, the inset panel 124 may be configured to prevent air from moving from a first side of the inset panel 124 to a second side of the inset panel 124.

In some embodiments, the frame 120 may define an insulation characteristic of the covering 100. For instance, the frame 120 may be sealed to allow for a vacuum to be created inside the frame 120, as described in more detail below. In other embodiments, the frame 120 may be filled with a low conductivity gas (e.g., argon or similar gas) to provide an insulation characteristic, as described below. In some embodiments, the frame 120 may be formed from materials with low thermal conductivity, such as stainless steel, aluminum, or other material, to decrease the thermal conductivity of the frame 120 itself. The low thermal conductivity of the frame 120 may also limit or prevent condensation formation on the frame 120, which may be beneficial in cold weather applications.

Each opening 122 of the frame 120 may be defined by a plurality of first frame members (e.g., a pair of rails 130) secured to a plurality of second frame members (e.g., a pair of stiles 132) at respective interfaces 134. The interfaces 134 may seal the rails 130 to the stiles 132 to allow for a vacuum to be created inside at least a portion of the frame 120. For example, the rails 130 may be welded to the stiles 132 to create an airtight interface between the rails 130 and stiles 132. Welding the stiles 132 to the rails 130 may provide a more ridged frame that will leak less air than a conventional bolted design. However, although welding is mentioned specifically, other suitable connection methods are contemplated that create an airtight interface and allow for a vacuum to be created inside at least a portion of the frame 120. For example, soldering, brazing, friction welding, laser welding, press-fitting, or using malleable or compressible materials are contemplated in addition to traditional and non-traditional welding methods that may or may not include welding filler materials to seal the joint. Depending on the application, the rails 130 and/or stiles 132 of one opening 122 may also define the rails 130 and/or stiles 132 of an adjacent opening 122. For instance, a single stile may define portions of horizontally adjacent openings 122 and/or vertically adjacent openings 122 of the frame 120. Similarly, a single rail may define portions of horizontally adjacent openings 122 and/or vertically adjacent openings 122 of the frame 120. In this manner, a single stile may run a vertical length of the frame 120 and/or a single rail may run a horizontal width of the frame 120 to define two or more adjacent openings 122.

In some embodiments, the plurality of panels 102 may be movably connected to move between positions, such as between a closed position and an open position, between a closed position and an overhead position, or otherwise between a first position and a second position. As shown in FIG. 2, the plurality of panels 102 may be pivotably connected via one or more hinges 140. For example, the multi-panel covering 100 may include one or more hinges 140 securing the first panel 110 to the second panel 112, one or more hinges 140 securing the second panel 112 to the third panel 114, and so on. In such embodiments, the first panel 110 may pivot relative to the second panel 112, the second panel 112 may pivot relative to the third panel 114, and so on to allow articulation of the covering 100 as the covering 100 is moved between positions, such as to enable movement of the covering 100 along a track of a garage door between a vertical (closed) position and a horizontal (open or overhead) position, though other configurations are contemplated.

Referring to FIG. 2, the hinges 140 may be secured to the panels 102 in many configurations. For instance, the hinges 140 may be welded to the panels 102, secured to the panels 102 via mechanical fasteners, formed integrally with one or more portions of the frame 120, or the like. In some embodiments, the hinges 140 may be secured to the panels 102 in a manner that does not compromise the integrity of a vacuum within the frame 120. For instance, in one or more embodiments, the hinges 140 may be secured to the panels 102 via a T-slot profile defined in each of the panels 102. For instance, at least a portion of the frame 120, such as at least a portion of a rail or stile, may have a profile having one or more channels or protrusions used to connect the hinges 140 to the frame 120. In such embodiments, the head of a bolt may be positioned within the channel for attaching the hinges 140 to the frame 120. In some embodiments, the attachment mechanism between the frame 120 and the hinges 140 may be similar to the 80/20 system of 80/20 Inc.

Figure 3:
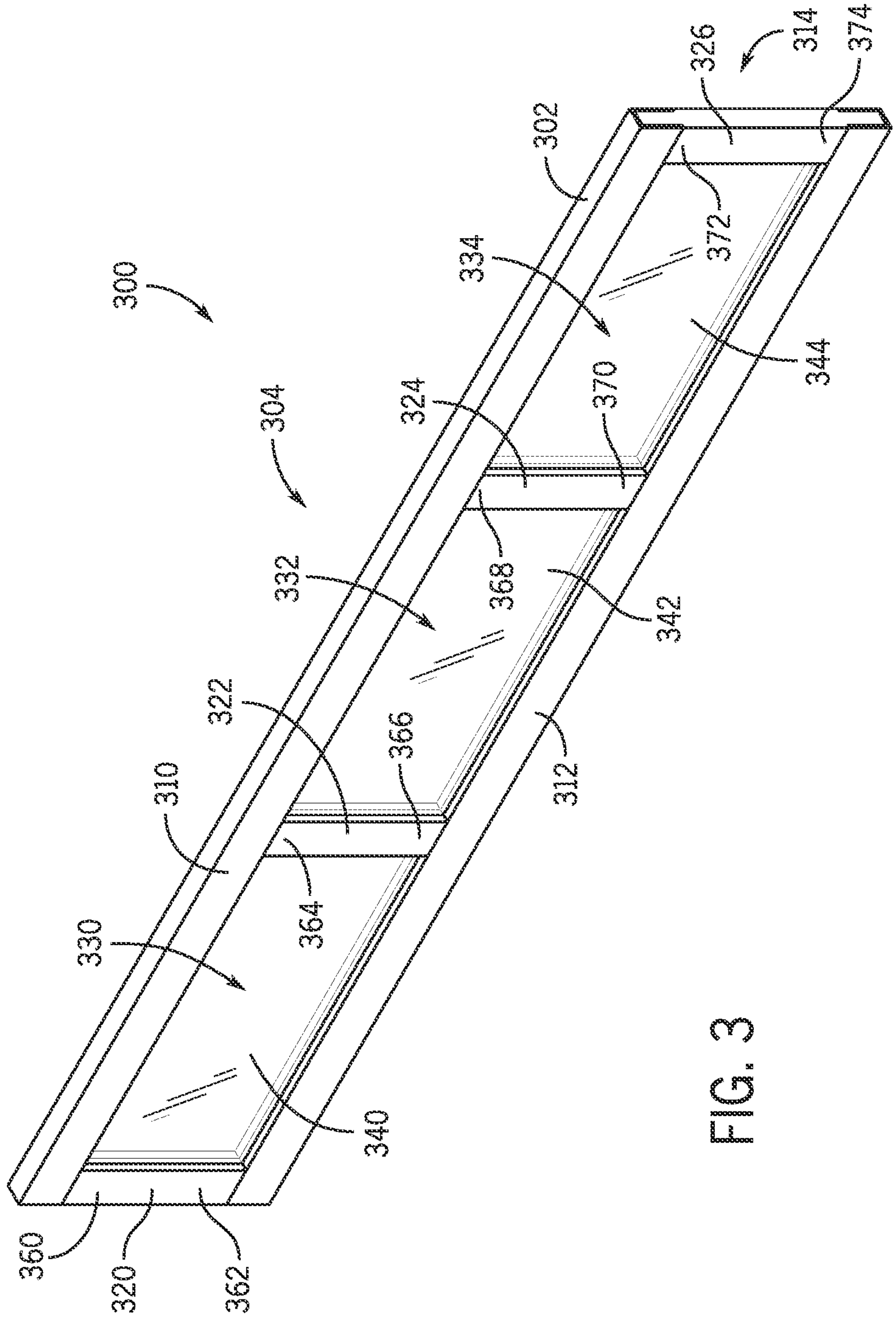
FIG. 3 illustrates a front perspective view of a panel of a multi-panel covering for an architectural opening in accordance with an embodiment of the disclosure.
Figure 4:
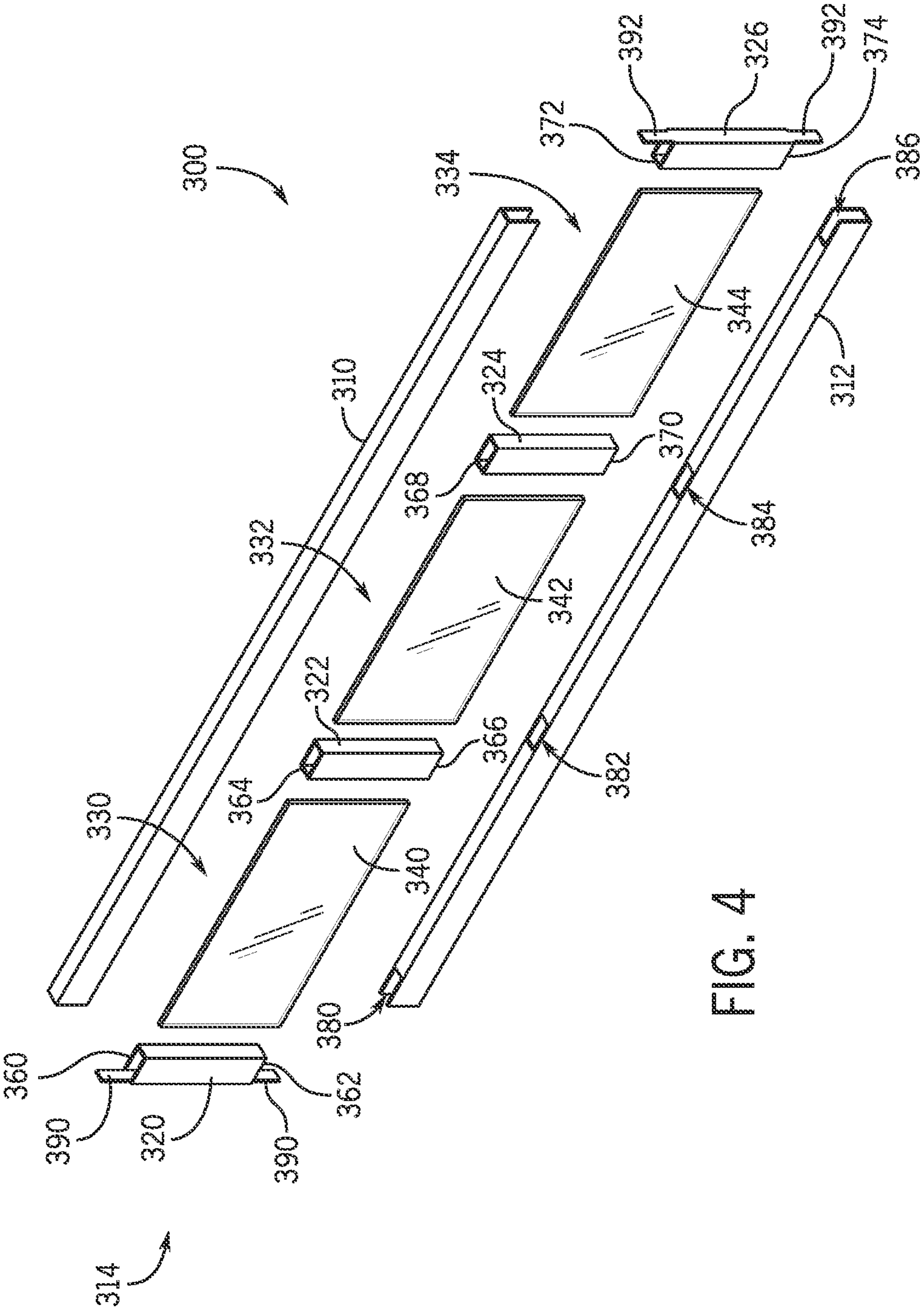
FIG. 4 illustrates an exploded view of the panel of FIG. 3 in accordance with an embodiment of the disclosure.

FIG. 3 illustrates a front perspective view of a panel 300 of a multi-panel covering for an architectural opening in accordance with an embodiment of the disclosure. FIG. 4 illustrates an exploded view of the panel 300 in accordance with an embodiment of the disclosure. Referring to FIGS. 3-4, the panel 300 may be configured to at least partially cover an architectural opening, such as a garage opening, a storefront opening, or the like. In this manner, the panel 300 may form part of a multi-panel covering, such as covering of FIGS. 1-2, described above. Accordingly, each of the panels 102 described above with reference to covering of FIGS. 1-2 may be similar to the panel 300 illustrated in and described with reference to FIGS. 3-4.

As shown in FIGS. 3-4, the panel 300 may include a frame 302 defined by a plurality of frame members 304, such as a first rail 310, a second rail 312, and a plurality of stiles 314 (e.g., a pair of stiles 314, more than two stiles 314, etc.) connected to and separating the first rail 310 and the second rail 312. As shown, the panel 300 includes a first stile 320, a second stile 322, a third stile 324, and a fourth stile 326. However, other configurations are contemplated, such as a lesser number of stiles 314 or a greater number of stiles 314 than illustrated. Accordingly, the configuration illustrated in FIGS. 3-4 and described below may be modified for different frame configurations. For example, in embodiments with only a pair of stiles 314 the second stile 322 and third stile 324 may be omitted. Similarly, only one of the second stile 322 and the third stile 324 may be omitted, one or more additional stiles 314 may be added between the first and fourth stiles 320, 326, or the like. The frame 302 may be similar to the frame 120 of FIGS. 1-2, described above.

Depending on the application, the panel 300 may include one or more openings defined by the frame members 304. For example, the first rail 310, second rail 312, first stile 320, and second stile 322 may define a first opening 330 of the panel 300. Similarly, the first rail 310, second rail 312, second stile 322, and third stile 324 may define a second opening 332 of the panel 300, and the first rail 310, second rail 312, third stile 324, and fourth stile 326 may define a third opening 334 of the panel 300. In such embodiments, the panel 300 may include a first inset panel 340 secured within the first opening 330 of the frame 302, a second inset panel 342 secured within the second opening 332 of the frame 302, and a third inset panel 344 secured within the third opening 334 of the frame 302. The first inset panel 340, second inset panel 342, and third inset panel 344 may be similar or may be configured differently. Each of the first inset panel 340, second inset panel 342, and the third inset panel 344 may be similar to the inset panel 124 of FIGS. 1-2, described above. For instance, each of the first inset panel 340, second inset panel 342, and third inset panel 344 may be one or more panes of glass, polymer, metal, natural material such as wood, or other material. In some embodiments, the first, second, and third inset panels 340, 342, 344 may be a transparent or translucent window, such as an insulated window. Although FIGS. 3-4 illustrate panel 300 as including three openings, the panel 300 may include any number of openings, such as one opening, two openings, or greater than three openings. In addition, the stiles 314 may be spaced equidistantly along the first rail 310 and the second rail 312 as illustrated in FIGS. 3-4, or the stiles 314 may be spaced unevenly along the first rail 310 and the second rail 312 to provide a desired opening size and/or configuration.

The first rail 310, second rail 312, and stiles 314 may include many configurations. For example, the first rail 310, the second rail 312, and each of the first, second, third, and fourth stiles 320, 322, 324, 326 may be hollow members, such as boxed frame members, hollow extrusions, or the like. In such embodiments, each of the first rail 310, the second rail 312, the first stile 320, the second stile 322, the third stile 324, and the fourth stile 326 may include an internal cavity, which may run the length of the respective frame members 304. In some embodiments, the frame members 304 may be secured together such that the respective internal cavities of the frame members 304 are in communication with one another. For example, the first, second, third, and fourth stiles 320, 322, 324, 326 may be secured to the first rail 310 and the second rail 312 such that the entirety of the frame 302 is hollow, though other configurations are contemplated, such as the frame 302 being at least partially hollow (e.g., greater than 25% hollow, greater than 50% hollow, greater than 75% hollow, greater than 90% hollow, or the like). In this manner, one cavity may be created within the frame 302 once the frame members 304 are secured together. In some embodiments, multiple cavities may be created within the frame 302 once the frame members 304 are secured together.

The frame members 304 may be secured together in many configurations. For instance, the first stile 320 may include opposing first and second ends 360, 362, the second stile 322 may include opposing third and fourth ends 366, the third stile 324 may include opposing fifth and sixth ends 368, 370, and the fourth stile 326 may include opposing seventh and eighth ends 372, 374. In such embodiments, the first end 360 of the first stile 320, the third end 364 of the second stile 322, the fifth end 368 of the third stile 324, and the seventh end 372 of the fourth stile 326 may be secured to the first rail 310, such as via welding or other fastening methods. Similarly, the second end 362 of the first stile 320, the fourth end 366 of the second stile 322, the sixth end 370 of the third stile 324, and the eighth end 374 of the fourth stile 326 may be secured to the second rail 312, such as via welding or other fastening methods, which may be the same or different than the connections to the first rail 310. The attachment of the first end 360, the third end 364, the fifth end 368, and the seventh end 372 to the first rail 310 and the attachment of the second end 362, the fourth end 366, the sixth end 370, and the eighth end 374 to the second rail 312 may be airtight. In this manner, the respective interfaces between the first rail 310 and each of the first stile 320, second stile 322, third stile 324, and fourth stile 326 may seal the first rail 310 to the first stile 320, second stile 322, third stile 324, and fourth stile 326 to allow for a vacuum to be created inside at least the first rail 310, the first stile 320, the second stile 322, the third stile 324, and the fourth stile 326, or any combination thereof. Similarly, the respective interfaces between the second rail 312 and each of the first stile 320, second stile 322, third stile 324, and fourth stile 326 may seal the second rail 312 to the first stile 320, second stile 322, third stile 324, and fourth stile 326 to allow for a vacuum to be created inside at least the second rail 312, the first stile 320, the second stile 322, the third stile 324, and the fourth stile 326, or any combination thereof.

In some embodiments, the first rail 310 and the second rail 312 may be configured to accommodate the stiles 314 and/or facilitate the connection between the stiles 314 and the respective rail. For instance, as shown in FIG. 4, the second rail 312 may include first, second, third, and fourth apertures 380, 382, 384, 386 to accommodate the respective attachments of the first stile 320, the second stile 322, the third stile 324, and the fourth stile 326 to the second rail 312. For instance, the first aperture 380 may receive at least a portion of the second end 362 of the first stile 320, the second aperture 382 may receive at least a portion of the fourth end 366 of the second stile 322, the third aperture 384 may receive at least a portion of the sixth end 370 of the third stile 324, and the fourth aperture 386 may receive at least a portion of the eight end of the fourth stile 326, or any combination thereof, for attachment of the first, second, third, and fourth stiles 320, 322, 324, 326 to the second rail 312. In some embodiments, the apertures may fluidically connect the internal cavities of the stiles and rails. For instance, the first aperture 380 may fluidically connect the internal cavities of the first stile 320 and the second rail 312, the second aperture 382 may fluidically connect the internal cavities of the second stile 322 and the second rail 312, the third aperture 384 may fluidically connect the internal cavities of the third stile 324 and the second rail 312, and the fourth aperture 386 may fluidically connect the internal cavities of the fourth stile 326 and the second rail 312, or any combination thereof. The first rail 310 may be configured similarly to the second rail 312 for attachment of the first, second, third, and fourth stiles 320, 322, 324, 326 to the first rail 310.

In some embodiments, the ends of the stiles 314 may be sized and/or shaped to facilitate attachment of the stiles 314 to the rails 310, 312. For instance, as shown in FIG. 4, each of the first end 360 and the second end 362 of the first stile 320 may include a tab 390 for connection with the first rail 310 and the second rail 312 to define respective terminal ends of the first rail 310 and the second rail 312. Similarly, each of the seventh end 372 and the eighth end 374 of the fourth stile 326 may include a tab 392 for connection with the first rail 310 and the second rail 312 to define respective opposite terminal ends of the first rail 310 and the second rail 312. Such examples are illustrative only, and the ends of the stiles 314 may be attached to the rails 310, 312 in other suitable configurations that seal the frame members 304 together and allow for a vacuum to be created inside the frame 302.

FIG. 5 illustrates a front perspective view of the panel 300 with an air evacuation path 500 in accordance with an embodiment of the disclosure. In embodiments, once the frame members 304 of the panel 300 are secured together, one or more internal cavities of the frame 302 may be evacuated and sealed to create a vacuum insulated panel section. For instance, at least portions of the frame 302 may be vacuum insulated to provide an insulation characteristic of the frame 302, such as limiting one or more convection and/or conduction heat paths through the frame 302. In this manner, the panel 300 may form at least a portion of an insulated door or other covering (e.g., garage door, storefront, etc.). The vacuum insulated characteristic of the panel 300 may reduce material costs and/or weight associated with other insulated methods. For example, conventional foam insulation may be omitted from the vacuum insulated panel to reduce weight and manufacturing costs. This may reduce the size of springs and other hardware needed to lift or support the panel 300. In addition, a fully sealed construction may reduce air leakage across the panel 300, further increasing an insulating efficiency of the panel 300. This may save energy costs and make an associated room more comfortable.

As shown, a vacuum 502 may be connected to the panel 300, such as at a vacuum connection 504 defined in the first rail 310 adjacent to the fourth stile 326, although other configurations are contemplated, including multiple vacuum connections 504, a connection at another portion of the panel 300, or enclosing part or all of the panel 300 inside a vacuum chamber. Once the vacuum 502 is connected to the panel 300, the internal cavitiy(ies) of the frame 302 are evacuated of air, after which the vacuum connection(s) 504 is/are sealed to create a vacuum insulated panel.

Figure 5A:
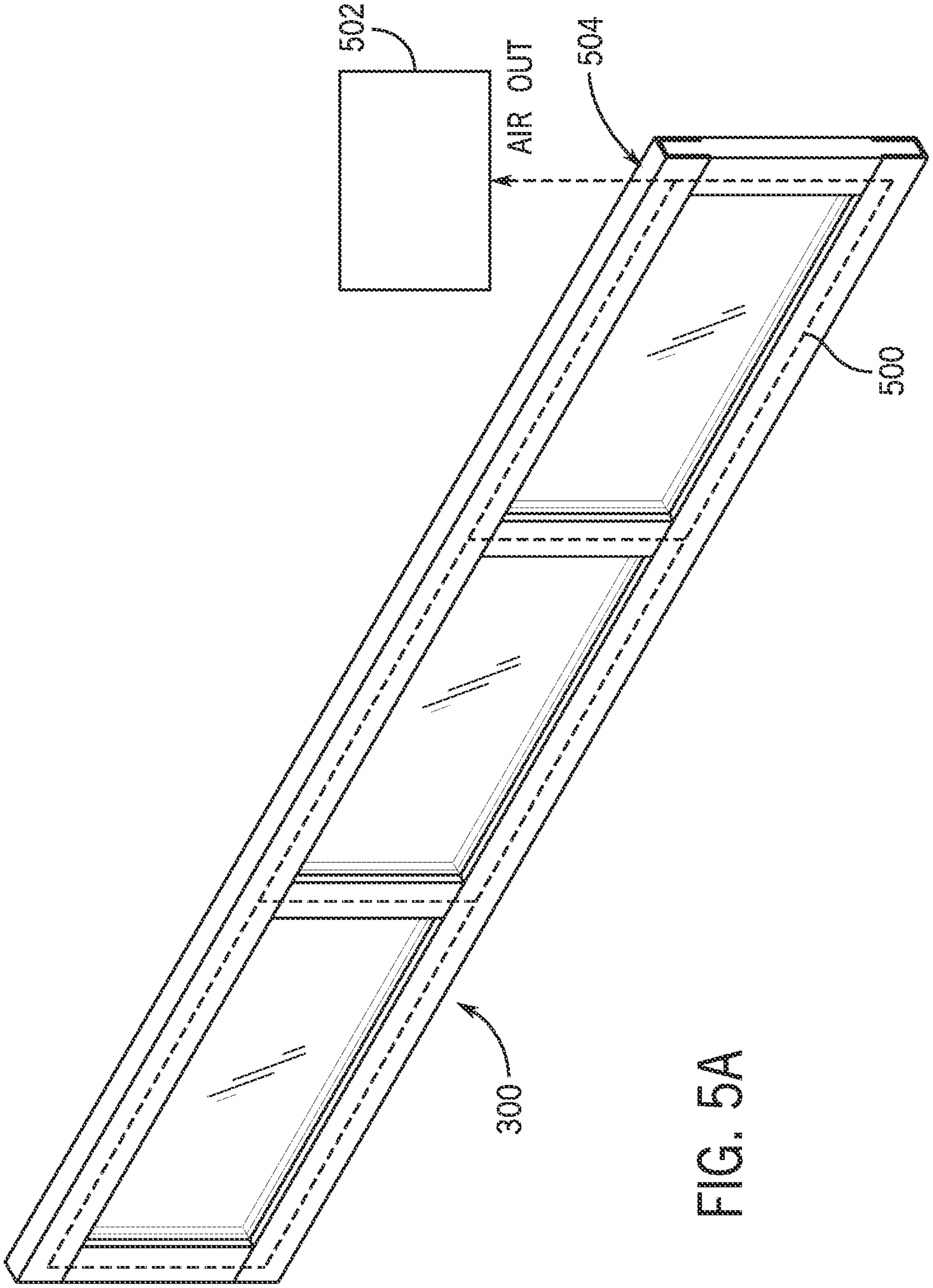
FIG. 5A illustrates a front perspective view of the panel of FIG. 3 with an air evacuation path in accordance with an embodiment of the disclosure.
Figure 5B:
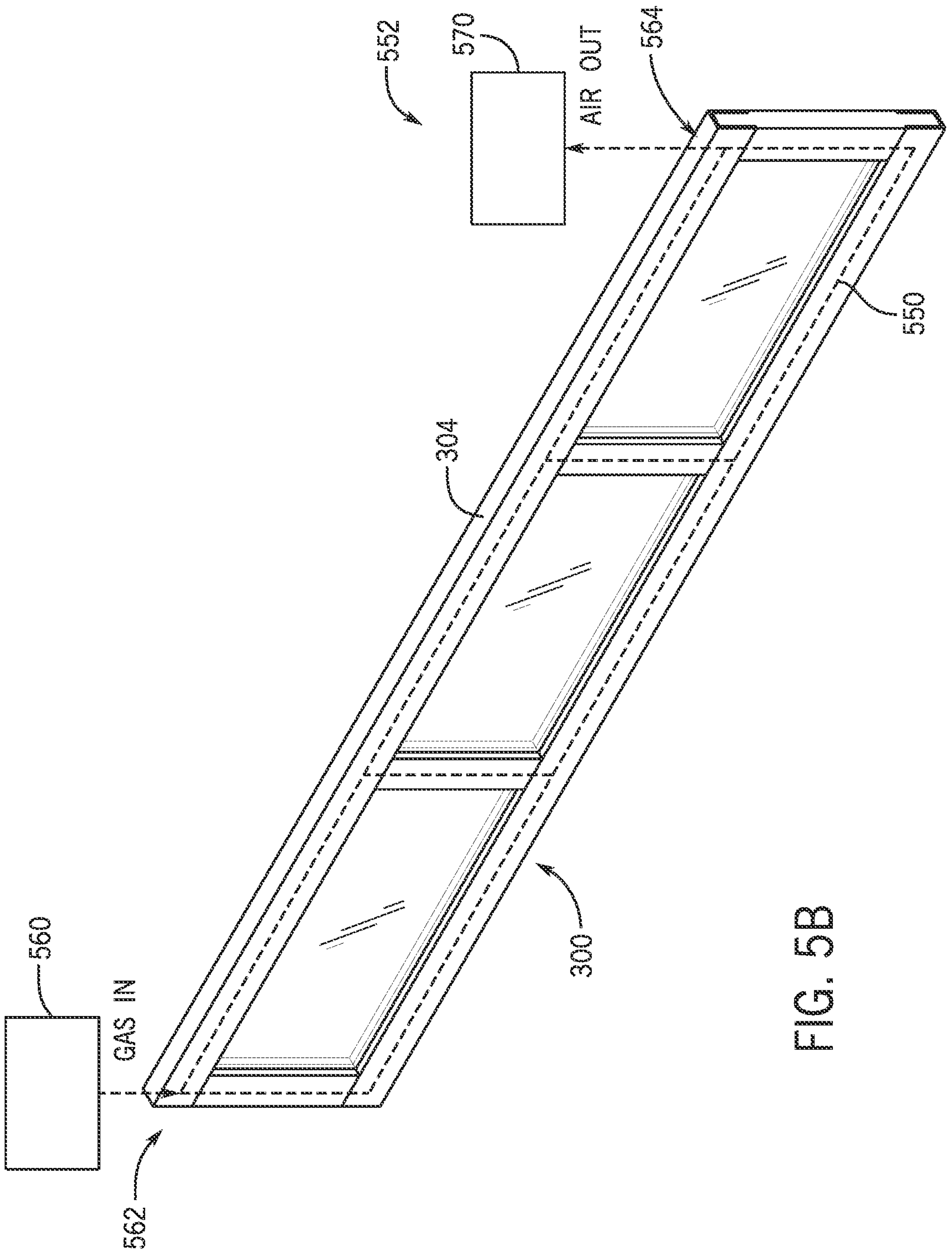
FIG. 5B illustrates a front perspective view of the panel of FIG. 3 with an air purging path in accordance with an embodiment of the disclosure.

FIG. 5B illustrates a front perspective view of the panel 300 with an air purging path 550 in accordance with an embodiment of the disclosure. In embodiments, one or more of frame members 304 may be filled with a low conductivity gas to provide an insulation characteristic of panel 300 and/or frame 302. For example, once the frame members 304 of panel 300 are secured together, the frame 302 may be filled with low conductivity gas and sealed to create an insulated panel section. In some embodiments, each frame member 304 may be filled with low conductivity gas and sealed independently. The low conductivity gas may be any gas having a thermal conductivity less than atmospheric air. For instance, the low conductivity gas may be argon gas, krypton gas, xenon gas, an argon/krypton blend, an argon/nitrogen blend, or any other gas or gas mixture producing an R-value better than atmospheric air. In some implementations, the thermal conductivity of atmospheric air is about 26.2 mW/(m·K) at 25 degrees Celsius. Accordingly, in some implementations, the thermal conductivity of the low conductivity gas may be in the range of about 2 to about 25.5 mW/(m·K) at 25 degrees Celsius. In some implementations, the range of suitable thermal conductivities of the low conductivity gas is about 4.59 mW/(m·K) to 5.61 mW/(m·K) at 25 degrees Celsius, 7.92 mW/(m·K) to 9.68 mW/(m·K) at 25 degrees Celsius, 14.4 mW/(m·K) to 17.6 mW/(m·K) at 25 degrees Celsius, or 22.8 mW/(m·K) to 25.2 mW/(m·K) at 25 degrees Celsius.

Similar to the vacuum-insulated panel 300 of FIG. 5A, the gas-filled panel 300 of FIG. 5B may reduce material costs and/or weight associated with other insulated methods. For example, conventional foam insulation may be omitted to reduce weight and manufacturing costs. This may reduce the size of springs and other hardware needed to lift or support the panel 300. In addition, a gas-filled frame may increase an insulating efficiency of the panel 300, saving energy costs and making an associated room more comfortable.

As shown, the frame members 304 and/or frame 302 may be filled with low conductivity gas using an air purging system 552. Air purging system 552 may include a gas source 560 (e.g., an argon gas source, a low conductivity gas source, etc.) providing a low conductivity gas to fill panel 300 or frame members 304, either collectively or individually. For example, low conductivity gas may be provided by gas source 560 at a fill connection 562. In embodiments, panel 300 or frame members 304 may be purged of atmospheric air. For example, atmospheric air may be first removed from panel 300/frame members 304 and replaced with low conductivity gas. In some embodiments, panel 300/frame members 304 may include a release valve 564 allowing air to be released from panel 300/frame members 304 as low conductivity gas is filling panel 300/frame members 304. Depending on the application, the air released from panel 300/frame members 304 (e.g., via release valve 564) may be vented to atmosphere or collected by an air collection system 570.

Figure 6:
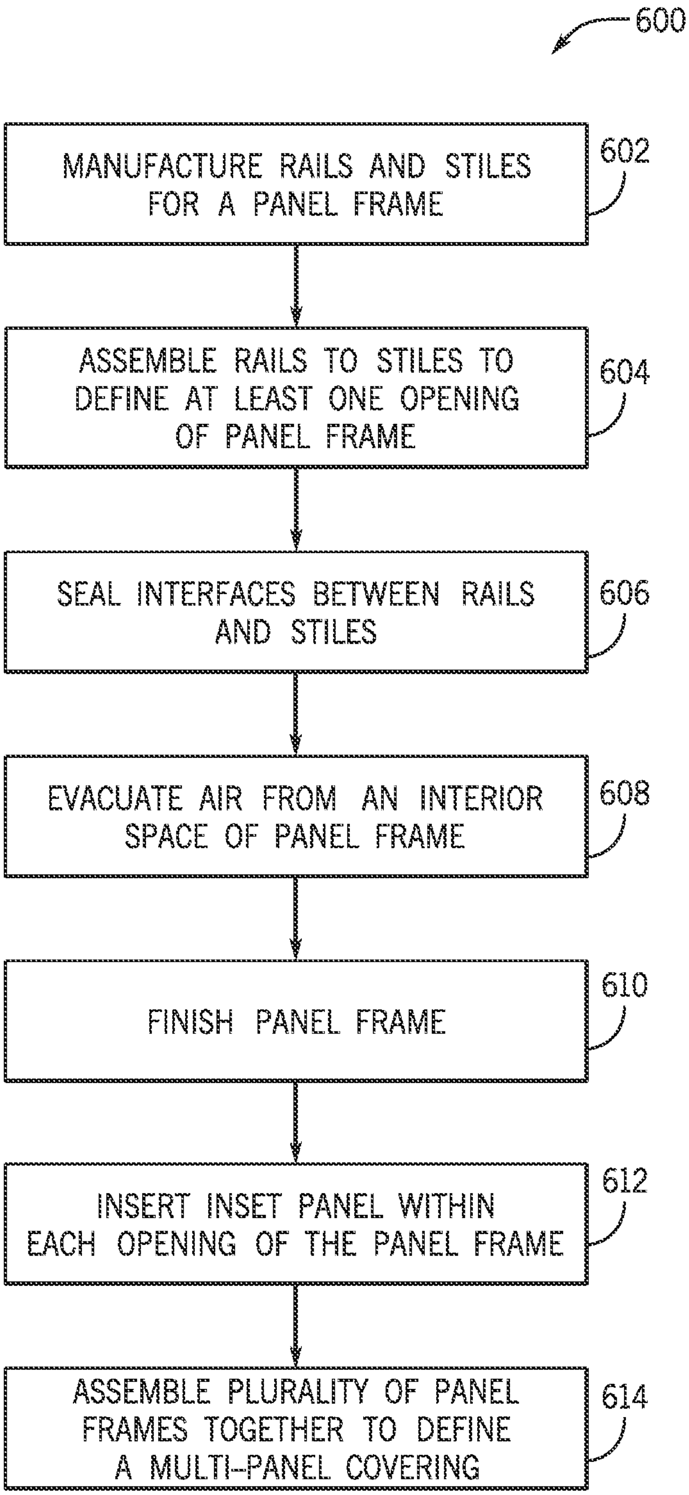
FIG. 6 illustrates a flow diagram of a process of assembling a multi-panel covering for an architectural opening in accordance with an embodiment of the disclosure.

FIG. 6 illustrates a flow diagram of a process 600 of assembling a multi-panel covering for an architectural opening in accordance with an embodiment of the disclosure. It should be appreciated that any step, sub-step, sub-process, or block of process 600 may be performed in an order or arrangement different from the embodiments illustrated by FIG. 6. For example, one or more blocks may be omitted from or added to the process 600. Although process 600 is described with reference to the embodiments of FIGS. 1-5, process 600 may be applied to other embodiments.

In block 602, process 600 may include manufacturing a plurality of rails and a plurality of stiles for a panel frame. The rails may be similar to the first rail 310 and second rail 312 of FIGS. 3-4, described above. The stiles may be similar to the first stile 320, second stile 322, third stile 324, and fourth stile 326 of FIGS. 3-4, described above. The panel frame may be similar to the frame 302 of FIGS. 3-5, described above. The rails and stiles may be manufactured via many methods and in many configurations. For example, the rails and stiles may be extruded from aluminum, stainless steel, or other metal in many profile shapes. Depending on the application, the rails and stiles may be manufactured in-house or may be purchased from a third-party manufacturer. In some embodiments, the rails and stiles may be off-the-shelf components or otherwise readily available in the market.

In block 604, process 600 includes assembling the plurality of rails to the plurality of stiles to define at least one opening of the panel frame. For instance, the first rail 310 and second rail 312 may be secured to the first stile 320, second stile 322, third stile 324, and fourth stile 326 of FIGS. 3-4, described above, such that various openings are defined in the panel frame. The rails may be assembled to the stiles in many configurations. For instance, the rails and stiles may be welded together, bolted together, molded together, or the like. In some embodiments, the rails and stiles may be placed in an assembly jig to assure proper assembly and alignment. Depending on the application, the rails and stiles may be assembled by hand, assembled via an automated process, or any combination thereof.

In block 606, process 600 includes sealing the interfaces between the plurality of rails and the plurality of stiles. In some embodiments, the interfaces may be sealed via the assembly process itself. For instance, sealing the interfaces may including welding the plurality of rails to the plurality of stiles. Depending on the application, the interfaces may be welded by hand or via an automated assembly (e.g., robotic welding). In some embodiments, the interfaces may be sealed using one or more additional components between the rails and stiles. For instance, a sealing element (e.g., O-ring, elastomeric material, etc.) may be placed between the rails and stiles to seal the interfaces and allow the panel frame to be vacuum sealed.

In block 608, process 600 includes evacuating air from an interior space of the panel frame. For instance, once the interfaces between the plurality of rails and the plurality of stiles are sealed, the panel frame may be connected to a vacuum or placed in a vacuum chamber and at least a portion of the panel frame may be vacuum insulated. For example, one or more internal cavities of the panel frame may be evacuated of air by vacuum. Once the internal cavity(ies) of the panel frame are evacuated of air, the vacuum connections may be sealed.

In block 610, process 600 may include finishing the panel frame after the panel frame is vacuum insulated. For instance, the panel frame may be powder coated or anodized, although other finishing options are contemplated, including painting, clear coated, or the like. Finishing the panel frame after the panel frame is assembled and vacuum insulated reduces the likelihood of the finish being damaged during assembly. This reduces scrap and rework costs and improves customer satisfaction with the panel frame.

In block 612, process 600 includes inserting a panel member within each opening of the panel frame. The panel member may be similar to the member of FIGS. 1-2 or the first inset panel 340, second inset panel 342, and third inset panel 344 of FIGS. 3-4, described above. For instance, the panel member may be a transparent or translucent window. In some embodiments, the window may include insulation characteristics itself, such as including multiple panes of glass, with the spaces between the panes turned into a vacuum or filled with gas with a lower thermal conductivity and heat capacity than "air." The panel member may be secured within the opening in many configurations. For instance, the panel member may be clipped to the panel frame, sealed to the panel frame, secured to the panel frame via mechanical fasteners, inserted within a receiving groove defined within the panel frame, among others.

In block 614, process 600 may include assembling a plurality of panel frames together to define a multi-panel covering. For instance, a plurality of panel frames may be hingedly connected to define a retractable multi-panel garage door, storefront, or the like. In such embodiments, the multiple panel frames may be secured together via one or more hinges. The hinges may be similar to the hinges 140 of FIG. 2, described above. For instance, the hinges may allow the multi-panel covering to articulate as the covering is moved between positions, such as to enable movement of the covering along a track between a vertical (closed) position and a horizontal (open or overhead) position.

Figure 7:
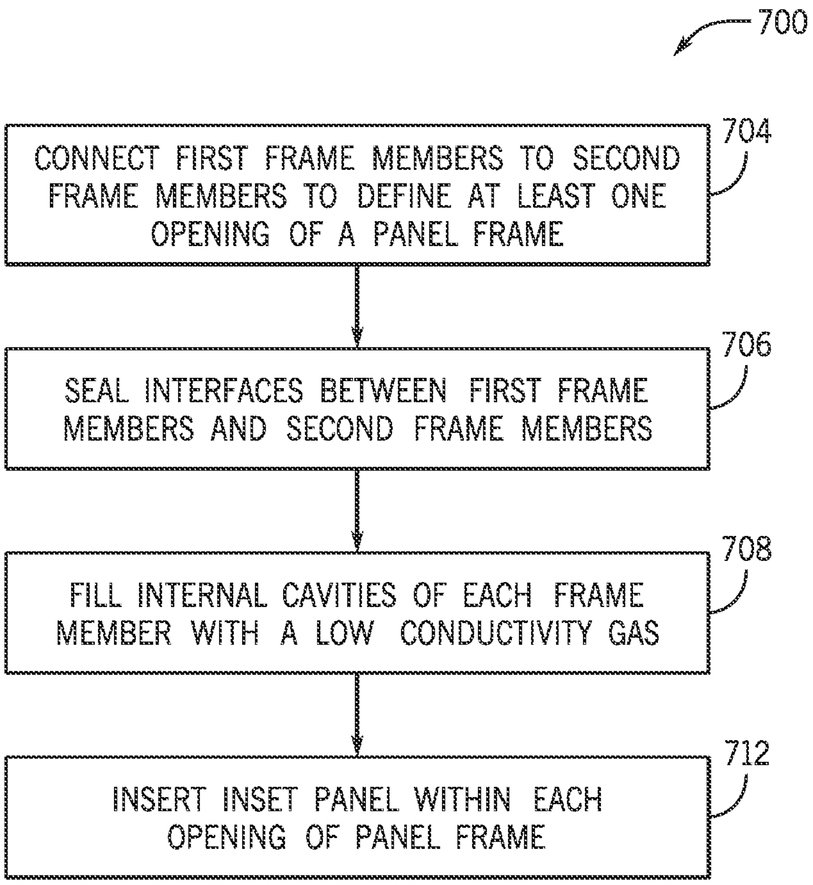
FIG. 7 illustrates a flow diagram of a process of assembling a panel frame of a covering for an architectural opening in accordance with an embodiment of the disclosure.

FIG. 7 illustrates a flow diagram of a process 700 of assembling a panel frame of a covering for an architectural opening in accordance with an embodiment of the disclosure. It should be appreciated that any step, sub-step, sub-process, or block of process 700 may be performed in an order or arrangement different from the embodiments illustrated by FIG. 7. For example, one or more blocks may be omitted from or added to the process 700, such as adding one or more blocks of process 600, described above. Although process 700 is described with reference to the embodiments of FIGS. 1-6, process 700 may be applied to other embodiments.

In block 704, process 700 includes connecting first frame members (e.g., rails) to second frame members (e.g., stiles) to define at least one opening of a panel frame. For instance, the first rail 310 and second rail 312 may be secured to the first stile 320, second stile 322, third stile 324, and fourth stile 326 of FIGS. 3-4, described above, such that various openings are defined in the panel frame. The frame members may be connected in many configurations. For instance, the frame members may be welded together, bolted together, molded together, or the like. In embodiments, the first frame members may be connected to the second frame members at respective interfaces to define at least one opening of a panel frame. In embodiments, block 704 may include positioning ends of the first frame members at least partially within respective apertures defined in the second frame members, as described above. The apertures may fluidically connect internal cavities of the frame members.

In block 706, process 700 includes sealing the interfaces between the first frame members and the second frame members. In embodiments, the interfaces may be sealed via the assembly process itself. For instance, sealing the interfaces may including welding the first frame members (e.g., rails) to the second frame members (e.g., stiles). In embodiments, the interfaces may be sealed using one or more additional components between the frame members, such as a sealing element (e.g., O-ring, elastomeric material, etc.) placed between the frame members to seal the interfaces.

In block 708, process 700 includes filling the internal cavities of each frame member with a gas having a thermal conductivity less than atmospheric air. In embodiments, block 708 may include purging atmospheric air from the internal cavity of each frame member, and sealing the internal cavity of each frame member independently. In embodiments, block 708 may include filling the panel frame with low conductivity gas once assembled.

In block 712, process 700 includes inserting an inset panel within the at least one opening of the panel frame. The inset panel may be similar to the member of FIGS. 1-2 or the first inset panel 340, second inset panel 342, and third inset panel 344 of FIGS. 3-4, described above. For instance, the inset panel may be a transparent or translucent window, an insulated panel, a corrugated steel panel, a plastic panel, or the like. In some embodiments, the inset panel may include insulation characteristics itself, such as including multiple panes of glass, with the spaces between the panes turned into a vacuum or filled with gas with a lower thermal conductivity and heat capacity than air. The inset panel may be secured within the opening in many configurations. For instance, the panel member may be clipped to the panel frame, sealed to the panel frame, secured to the panel frame via mechanical fasteners, inserted within a receiving groove defined within the panel frame, etc.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus for an architectural opening, the apparatus comprising:

a plurality of panels pivotably connected together, at least one of the plurality of panels comprising:

a frame comprising a plurality of first frame members connected to a plurality of second frame members at respective interfaces to define at least one opening, wherein the interfaces are defined by ends of the plurality of first frame members positioned at least partially within respective apertures defined in the plurality of second frame members, and wherein each of the first and second frame members comprise an internal cavity filled with a gas having a thermal conductivity between 2 mW/(m·K) and 25.5 mW/(m·K) at 25 degrees Celsius; and an inset panel secured within the at least one opening.

2. The apparatus of claim 1, wherein the apertures fluidically connect the internal cavities of the plurality of first frame members and the plurality of second frame members.

3. The apparatus of claim 2, wherein:

the first frame members comprise stiles of the frame; and the second frame members comprise rails of the frame.

4. The apparatus of claim 1, wherein the internal cavity of each frame member is independently sealed.

5. The apparatus of claim 1, wherein:

the gas is an argon gas; and the frame is formed from stainless steel or aluminum.

6. The apparatus of claim 1, wherein the inset panel prevents air from moving from a first side of the inset panel to a second side of the inset panel.

7. A panel configured to cover an architectural opening at least partially, the panel comprising:

a frame comprising a plurality of first frame members connected to a plurality of second frame members at respective interfaces to define at least one opening, wherein the interfaces are defined by ends of the plurality of first frame members positioned at least partially within respective apertures defined in the plurality of second frame members, and wherein each of the first and second frame members comprise an internal cavity filled with a gas having a thermal conductivity between 2 mW/(m·K) and 25.5 mW/(m·K) at 25 degrees Celsius; and an inset panel secured within the at least one opening.

8. The panel of claim 7, wherein the apertures fluidically connect the internal cavities of the plurality of first frame members and the plurality of second frame members.

9. The panel of claim 8, wherein:

the first frame members comprise stiles of the frame; and the second frame members comprise rails of the frame.

10. The panel of claim 7, wherein the internal cavity of each frame member is independently sealed.

11. The panel of claim 7, wherein:

the gas is an argon gas; and the frame is formed from stainless steel or aluminum.

12. The panel of claim 7, wherein the inset panel prevents air from moving from a first side of the inset panel to a second side of the inset panel.

13. A system comprising:

a plurality of panels, at least one of the plurality of panels according to claim 8; and one or more hinges allowing relative pivoting movement between the plurality of panels along a track of a garage door.

14. A method comprising:

connecting a plurality of first frame members to a plurality of second frame members at respective interfaces to define at least one opening of a panel frame, wherein each of the first and second frame members comprise an internal cavity, wherein the connecting comprises positioning ends of the plurality of first frame members at least partially within respective apertures defined in the plurality of second frame members;

filling the internal cavities of each frame member with a gas having a thermal conductivity between 2 mW/(m·K) and 25.5 mW/(m·K) at 25 degrees Celsius; and inserting an inset panel within the at least one opening.

15. The method of claim 14, further comprising sealing the interfaces between the plurality of first frame members of the plurality of second frame members.

16. The method of claim 14, wherein the apertures fluidically connecting the internal cavities of the plurality of first frame members and the plurality of second frame members.

17. The method of claim 14, wherein the filling comprises:

purging atmospheric air from the internal cavity of each frame member; and sealing the internal cavity of each frame member independently.

* * * * *